United States Patent
Ito

[15] 3,673,400
[45] June 27, 1972

[54] SLIP RATIO CALCULATING DEVICE

[72] Inventor: Osamu Ito, Tokyota, Japan

[73] Assignee: Nippondenso Kabushiki Kaisha, Kariya-shi, Aichi-ken, Japan

[22] Filed: May 28, 1970

[21] Appl. No.: 41,293

[30] Foreign Application Priority Data

June 9, 1969 Japan................................44/45200

[52] U.S. Cl...........................235/196, 73/510, 235/183, 307/123, 324/163
[51] Int. Cl. ...............................................G06g 7/16
[58] Field of Search....................235/183, 195, 196; 73/118, 73/514, 517, 510; 324/163, 161; 307/123

[56] References Cited

UNITED STATES PATENTS

| | | | |
|---|---|---|---|
| 3,043,516 | 7/1962 | Abbott et al............................235/195 |
| 2,051,018 | 8/1936 | Umansky............................324/161 X |
| 3,383,501 | 5/1968 | Patchell................................235/195 |
| 2,387,901 | 10/1945 | Haverstick...........................73/118 X |
| 3,257,612 | 6/1966 | Gorrill et al.........................324/161 X |
| 3,492,471 | 1/1970 | Crowell...............................235/196 X |
| 3,502,983 | 3/1970 | Ingle et al. ..........................235/196 X |
| 3,521,046 | 7/1960 | Le Vel Tippetts.....................235/195 |

*Primary Examiner*—Felix D. Gruber
*Attorney*—Cushman, Darby & Cushman

[57] ABSTRACT

A slip ratio calculating device for calculating a slip ratio, i.e., the ratio of two revolutions are prepared, one of the voltage signals is multiplied by one n-th in a coefficient multiplying circuit. This coefficient-multiplied output is integrated in a first integrating circuit and then compared with the other of said voltage signals in a comparator. This comparator generates an output when the two input signals become equal. The resultant output works to reset the integrating circuit through a reset pulse generating circuit. The first integrating circuit renews integration upon disappearance of a reset pulse. There is provided a second integrating circuit which integrates the output of a constant voltage generating circuit and is reset by said reset pulse. The peak value of the integrated voltage is proportional to the revolution ratio. Thus, the ratio of two revolutions which is subjected to restless change can be obtained in the form of the peak value of the output voltage from the second integrating circuit.

3 Claims, 3 Drawing Figures

PATENTED JUN 27 1972 3,673,400

INVENTOR

OSAMU ITO

BY Cushman, Darby & Cushman
ATTORNEYS 3,673,400

SLIP RATIO CALCULATING DEVICE

BACKGROUND OF THE INVENTION

This application contains subject matter disclosed in the copending Sumiyoshi et al. application Ser. No. 876,784, filed Nov. 14, 1969.

1. Field of the Invention

This invention relates to a slip ratio calculating device which can calculate a slip ratio with high accuracy. Here, the ratio $[N_2/N_1]$ of the revolution $N_2$ of the shaft of a torque converter turbine to the revolution $N_1$ of the shaft of a torque converter pump in an automatic speed change device comprising a torque converter including a pump and a turbine, a speed change gear and an oil pressure controlling circuit for controlling the working oil pressure in the speed change gear box is referred by the term slip ratio.

In automatic speed change devices with a torque converter, oil pressure is controlled to minimize torque fluctuations upon change of speed and it is preferably done according to the slip ratio. Thus, there is a need for calculating the slip ratio.

2. Description of the Prior Art

There have been a variety of ways for calculating a voltage ratio, for example those using a Hall element or a quadratic element. But, they produce only approximate values and it is difficult for them to accurately provide a value of two significant figures. Further, temperature compensation is difficult particularly when used in automobiles. There is another way of calculating a voltage ratio employing digital circuits with high accuracy but it results in a complicated structure and a high cost.

SUMMARY OF THE INVENTION

An object of this invention is to provide an accurate slip ratio operating device of the analog calculation type having a simple circuit structure and being stable for a temperature change.

According to an embodiment of the invention, there are provided the following advantages:

1. Since the device is composed of stable circuits such as integrating circuits, comparator, a low pass filter circuit, a reset pulse generating circuit, and a constant voltage source, it is stable with respect to a temperature change, free from miss-operation and has high reliability;
2. The present structure enables rapid response to the variations in $N_1$ and/or $N_2$ and faithfully responds to a transitional state of a speed change in the case of automatic speed change; and
3. A slip ratio calculation having a value of three significant figures is possible with high accuracy.

In the above description, the case of $N_1 > N_2$ is referred but in the case of $N_1 < N_2$ the slip ratio calculation can similarly be done. This invention is particularly adapted for the calculation in the one limited case of $N_1 > N_2$ or $N_1 < N_2$, however.

DESCRIPTION OF THE PREFERRED EMBODIMENT

Figure 1:
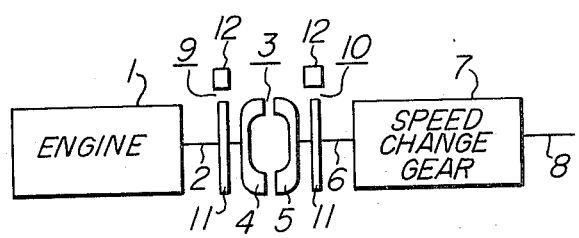
FIG. 1 is a schematic diagram of an automatic speed change device with a torque converter.
Figure 2:
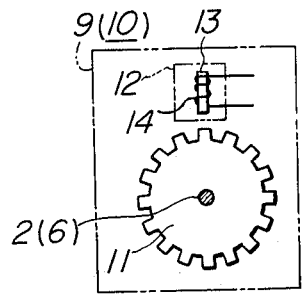
FIG. 2 is a schematic diagram of a revolution detector.

In FIG. 1, the main shaft 2 of an engine 1 is connected to the torque converter pump 4 of a torque converter 3. The torque converter turbine 5 is connected to a speed change gear 7 through a turbine output shaft 6. The speed change gear 7 is, as is well known, composed of speed reduction means comprising a train of gears and frictional engagement means which operates by pressurized oil. The working oil pressure is supplied from an oil pressure source (not shown). The output shaft 8 of the speed change gear 7 transmits torque to the wheels of an automobile (not shown). A torque converter pump revolution detector 9 and a torque converter turbine revolution detector 10 are provided to the main shaft 2 and the torque converter turbine output shaft 6, respectively. Each of these detectors comprises, as is shown in FIG. 2, a toothed disk 11 coupled with the main shaft or the turbine output shaft and a detector 12. The disk 11 is shaped to have many teeth on its periphery. The detector 12 comprises a magnet 13 on which a wire 14 is wound to generate a voltage by the change of leakage magnetic flux due to the travelling of teeth on the disk 11 near the magnet 13. The voltage is provided in the form of a pulse signal having a frequency equal to the revolution of the main shaft 2 or the turbine output shaft 6 multiplied by the number of teeth of the disk 11. It is apparent, however, that the revolution detectors 9 and 10 are not limited to those exemplified in the figure but may be any type provided that it generates an electrical output in accordance with the revolution.

In a torque converter, etc., control system using a slip ratio detector usually does not cover the region of slip ratios larger than unity and operates as if the slip ratio is unity when the real slip ratio exceeds unity. In such a case, it may be preferable for a slip ratio detector not to indicate a slip ratio larger than unity. This invention is particularly fitted for such a case.

Figure 3:
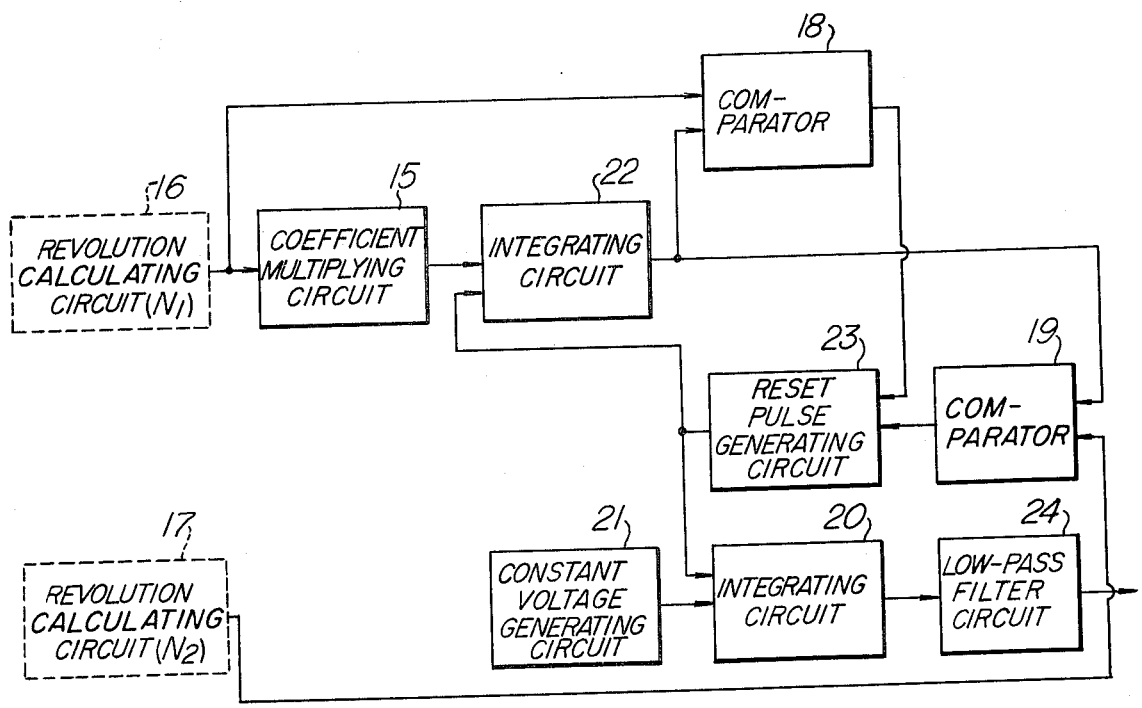
FIG. 3 is a block diagram of a slip ratio calculating device according to the invention.

An embodiment of a slip ratio calculating device for calculating the ratio of two signals proportional to revolutions $N_1$ and $N_2$ thus derived, is shown in FIG. 3. The device comprises a coefficient multiplying circuit 15 having an input connected to the output of one revolution calculating circuit $[N_1]$, the coefficient multiplier multiplying the input signal by a coefficient $1/n$, an integrating circuit 22 having a signal input connected to the output of the coefficient multiplying circuit 15 for integrating $[N_1]/n$, and a comparator 19 having one input connected to the integrating circuit 22 and another input to the other revolution calculating circuit 17 which supplies an output $[N_2]$, the comparator 19 generating an output when the two inputs become equal. A reset pulse generating circuit 23 has an input connected to the output of the comparator 19 and generates a reset pulse output to the reset signal input of the integrating circuit 22 when it receives a signal from the comparator 19. The output of the reset pulse generating circuit 23 is also connected to the reset signal input of the integrating circuit 20 the signal input of which connected to a constant voltage generating circuit 21 and the output of which is derived outside for utility through a low-pass filter 24, for smoothing the waveform. The coefficient multiplier 15 may be composed of a potentiometer and $n$ is an arbitrary constant number, for example $n = 100$ in the case for attaining an accuracy of one hundredth or a value of two significant figures and $n = 1,000$ in the case for obtaining an accuracy of one thousandth or a value of three significant figures. The revolution calculating circuits 16 and 17 may include an amplifier, an amplitude limiter, and a frequency-d.c. voltage converter. Another comparator 18 receives the outputs of the revolution calculating circuit 16 and the integrating circuit 22 and supplies its output to the reset pulse generating circuit 23 which also receives the output of the comparator 19 and gives a reset pulse to the integrating circuit 22 and to another integrating circuit 20 connected to a constant voltage generating circuit 21 upon reception of a signal from either one of the comparators 18 and 19. Each of the integrating circuits 20 and 22 may comprise an amplifier circuit having capacity feedback. The comparator 19 generates an output voltage, when the output of the integrating circuit 22 becomes equal to the output of the revolution calculating circuit 17, to the reset pulse generating circuit 23 which generates a short pulse of constant time width to reset the integration action of the circuits 20 and 22. Here, the term "reset" means the steps of terminating the integrating action and setting the initial condition to zero voltage. Upon reset of the integrating circuits 20 and 22, the outputs of the circuits 20 and 22 becomes zero and upon the termination of the reset pulse, the circuits 20 and 22 restarts the integrating action. The comparator 18, which performs an additional reset triggering function, generates an output when the output of the integrating circuit 22 becomes equal to that of the revolution calculating circuit 16 before it becomes equal to the output of another revolution calculating circuit 17 (otherwise, the comparator 19 works to reset integration). This output is sent to the reset pulse generating circuit 23 to generate a reset pulse. This corresponds to the case of $[N_1] \leq [N_2]$, where $[N_1]$ and $[N_2]$ represent the outputs of the revolution calculating circuits 16 and 17, respectively. It will be understood that in such a case $$\left(\text{slip ratio } S = \frac{N_2}{N_1} \geq 1\right)$$

) the system generates only an output representing S=1. This system is convenient for the case where the voltage corresponding to the slip ratio becomes unnecessary for when the slip ratio S exceeds unity, $S \geq 1$. When the slip ratio for both the cases of $[N_1] \geq [N_2]$ and $[N_1] \leq [N_2]$, it is natural that the comparator 18 will not be needed. The low pass filter circuit 24 transforms the output of the circuit 20 into a d.c. voltage.

The operation of the device of FIg. 3 will be described hereinafter. First, the output voltage $[N_1]$ of the revolution calculating circuit 16 is divided by $n$ in the coefficient multiplying circuit 15 to generate an output of $[N_1]/n$, which is then integrated in the integrating circuit 22 to give a result of $K' \int [N_1]/n \, dt$, where $K'$ is an integrater constant and $t$ represents time (sec). The integral $K' \int [N_1]/n \, dt$ is compared with the output voltage $[N_2]$ of the revolution calculating circuit 17 in the comparator 19, which generates an output voltage to activate the reset pulse generating circuit 23 when the condition $K' \int [N_1]/n \, dt = [N_2]$ is satisfied. Upon activation, the reset pulse generating circuit 23 supplies a reset pulse and resets the integrating circuit 22, determining the integration region $[o, T_c]$. Thus the integrating circuit 22 performs the calculations of $$K' \int_0^{T_o} \frac{[N_1]}{n} dt = K' \frac{[N_1]}{n} T_o$$

Here, it is preferable to select $T_c$ to be sufficiently small so that the voltage $[N_1]$ can be considered to be constant. The constant voltage generating circuit 21 generates a constant voltage C and the integrating circuit 20 performs the integration of $K'' \int C \, dt$, where $K''$ is an integrater constant and may differ from $K'$. Upon reception of the reset pulse from the reset generating circuit 23, the integrating circuit 20 finishes the integration of $$K'' \int_0^{T_o} C dt = K'' C T_o$$

Since the comparator 19 has detected that $$K' \int_0^{T_o} \frac{[N_1]}{n} dt$$

is equal to $[N_2]$ when it begins to generate an output voltage, the relation $K' [N_1]/n \, T_c = [N_2]$ holds. Substituting $$T_o = \frac{[N_2]}{[N_1]} \frac{n}{K'}$$

in the relation $$K'' \int_0^{T_o} Cdt = K'' C T_o$$

we obtain $$K'' C T_o = K'' C \frac{[N_2]}{[N_1]} \frac{n}{K'}$$

$$= K \frac{[N_2]}{[N_1]} \; (\text{putting } \frac{K''Cn}{K'} = K)$$

$$= KS$$

Thus, the peak value of the output voltage of the integrating circuit 20 is proportional to the slip ratio S. Hence, the output voltage of the low pass filter circuit 24 which is proportional to said peak value is proportional to the slip ratio S.

As an example, if $N_1 = 1,000$ rpm and $N_2 = 830$ rpm, S = 0.83. In this case, the operation is done in the following way. Provided that $[N_1] = 1$ V, $[N_2] = 0.83$ V and $n = 100$, the output voltage of the coefficient multiplying circuit 15 is 0.01 V, and the output voltage of the integrating circuit 22 becomes equal to $[N_2]$ at the time $$T_o = \frac{1}{K'} \cdot \frac{0.83}{0.01} = \frac{83}{K'}$$

from the equation $[N_2] = K'/n \, [N_1] \, T_c$. Here, if $K' = 100,000$ (1/sec), $T_c = 0.83$ m sec. Further, if $K' = K'' = 100,000$ (1/sec) and $C = 0.01$ V, the output of the integrating circuit 20 becomes $K'' [C] T_c = 100,000$ (1/sec) $\times 0.01$ V $\times 0.83$ m sec = 0.83 V. That is, a voltage of the same value as that of the slip ratio 0.83 is derived as the output of the integrating circuit 20, and thus the output voltage of the smoothing circuit 24 becomes approximately equal to 0.83 V. Thus the value of the slip ratio in the effective figure in two ranks is provided as the output of the smoothing circuit 24. As is described above, the slip ratio calculation can be done based on two independently varying values of $N_1$ and $N_2$, representing the revolutions of the main shaft 2 of an engine 1 and the output shaft 6 of the turbine without a time lag greater than 0.01 sec.

What is claimed is:

1. A slip ratio calculating device for calculating the ratio of two revolutions given in the form of electric voltage signal comprising:

a coefficient multiplying circuit for multiplying one voltage signal representing one revolution by $1/n$, $n$ being a predetermined constant;

a first integrating circuit having a signal input connected to said coefficient multiplying circuit for integrating the output voltage thereof, the first integrating circuit having a reset input;

a comparator having one input connected to said first integrating circuit and another input supplied with the other voltage signal representing the other revolution for comparing the two inputs and supplying an output when the two inputs become equal;

a constant voltage source for supplying a predetermined constant voltage;

a second integrating circuit having an input connected to said constant voltage source for integrating said constant voltage, the second integrating circuit having a reset input; and a reset pulse generating circuit having an input connected to said comparator and an output connected to both of the reset inputs of said first and second integrating circuit for generating a reset pulse voltage upon reception of an output of said first comparator and supplying the reset pulse output to both the reset inputs of said first and second integrating circuits to reset the two integrating circuits to cause renewed integration by said two integrating circuits upon disappearance of each reset pulse and to effect thereby a representation by the peak voltage of the output of said second integrating circuit of the instantaneous slip ratio of the two revolutions.

2. A slip ratio calculating device according to claim 1, further comprising:

means for providing a slip ratio representation of unity when said one revolution is larger than said the other revolution and including a second comparator having one input connected to the output of said first integrating circuit and another input supplied with the other voltage signal representing the other of said revolutions and an output connected to said reset pulse generating circuit for comparing the two inputs and supplying an output voltage to said reset pulse generating circuit when the two inputs become equal.

3. A slip ratio calculating device according to claim 1, further comprising:

a low pass filter connected to the output of said second integrating circuit for smoothing the output of the second integrating circuit to provide a signal proportional to said peak voltage.

* * * * *